(No Model.) 2 Sheets—Sheet 1.
P. ODENBRETT.
PNEUMATIC CHEST FOR PIPE ORGANS.
No. 254,562. Patented Mar. 7, 1882.
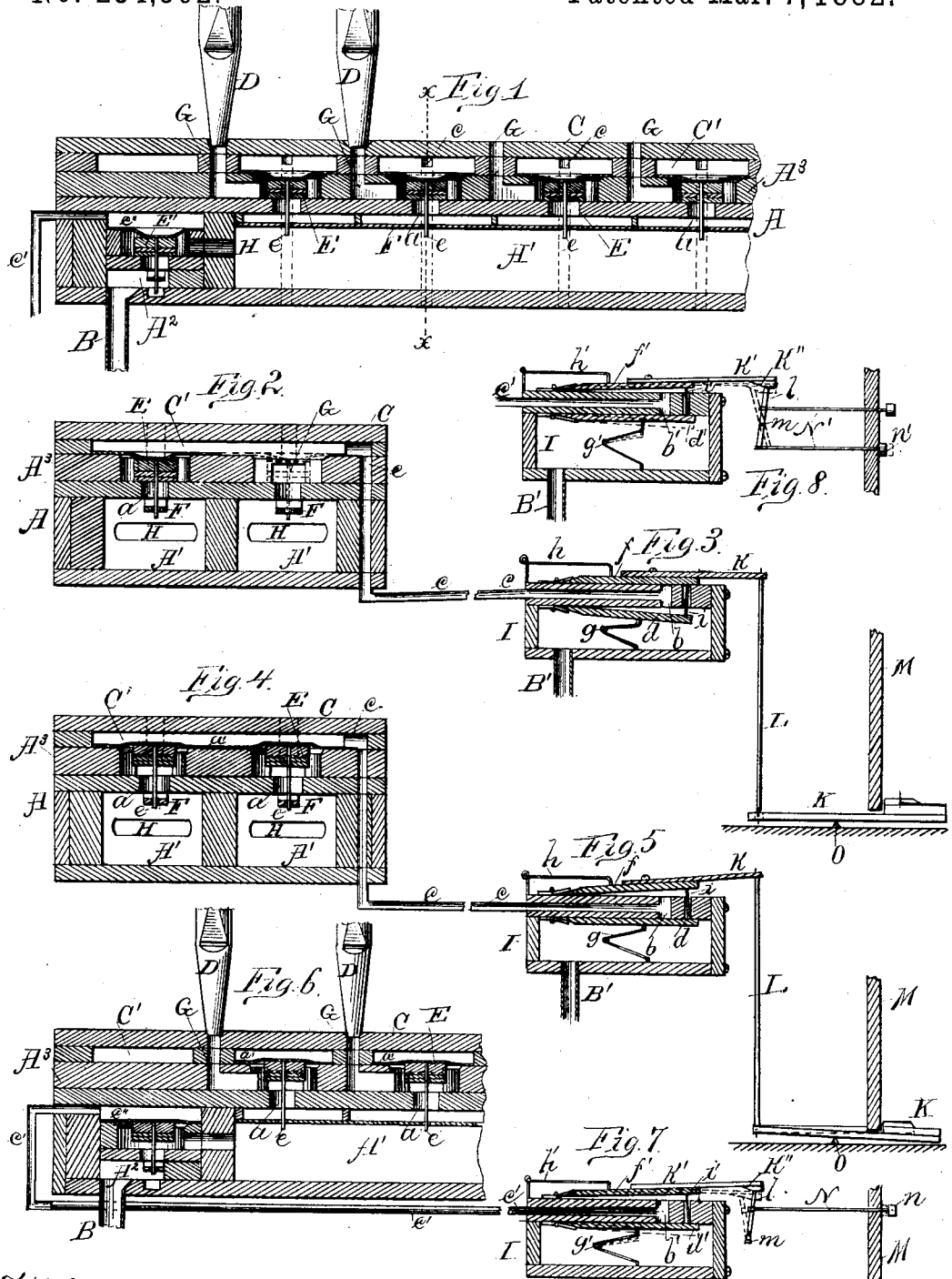
Witnesses:
E. G. Asmus
Henry Hovorson
Inventor
Philip Odenbrett
By Stout & Underwood
Attorneys.

(No Model.) 2 Sheets—Sheet 2.

P. ODENBRETT.
PNEUMATIC CHEST FOR PIPE ORGANS.

No. 254,562. Patented Mar. 7, 1882.

Witnesses
E. G. Asmus
Henry Norrison

Inventor
Philip Odenbrett
By Stout & Underwood
Attorneys

UNITED STATES PATENT OFFICE.

PHILIP ODENBRETT, OF MILWAUKEE, WISCONSIN.

PNEUMATIC CHEST FOR PIPE-ORGANS.

SPECIFICATION forming part of Letters Patent No. 254,562, dated March 7, 1882.

Application filed October 4, 1881. (No model.)

*To all whom it may concern:*

Be it known that I, PHILIP ODENBRETT, of Milwaukee, in the county of Milwaukee, and in the State of Wisconsin, have invented certain new and useful Improvements in Pneumatic Chests for Pipe-Organs, &c.; and I do hereby declare that the following is a full, clear, and exact description thereof.

My invention relates to pneumatic chests for pipe-organs; and it consists in certain peculiarities of construction, which will be fully explained hereinafter.

Figure 9:
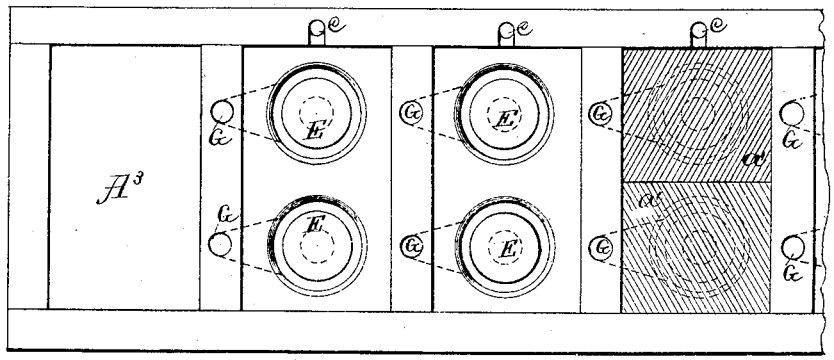
Figure 10:
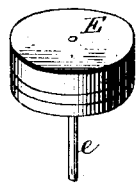

In the drawings, Figure 1 is a longitudinal section of a wind-chest embodying my invention, in its normal position, when the stops and keys are at rest. Fig. 2 is a cross-section of the said chest in normal position on line $xx$, Fig. 1, with one of the pallets represented in dotted lines to show one of the air-passages to the organ-pipes. Fig. 3 is a cross-section of the key-board with key in normal position, and of the small valve-chest in the rear of the key-board, showing the connection by an air-tube to the wind-chest, Fig. 2. Figs. 4 and 5 are counterparts of Figs. 2 and 3, with the key depressed and pallets raised to admit air to the organ-pipes. Fig. 6 is a counterpart of Fig. 1, with the pallets all raised by the action of the stops and keys. Fig. 7 is a sectional view of a continuation of the small valve-chest shown in Figs. 3 and 5, showing the action of a single stop operated by drawing or pulling. Fig. 8 is a like view, showing the action of a double stop operated solely by pushing. Fig. 9 is a plan view of the pallet-chest, showing some of the pallets covered with leather or other air-tight flexible material; and Fig. 10 is a detail view of a pallet. Figs. 3, 5, 7, and 8 are drawn to a much larger scale than Figs. 1, 2, 4, and 6, in order to show the construction and operation of the small valve-chest and its connections.

A represents the wind-chest or sound-board of a pipe-organ, the lower part of which is divided into the main air-chambers A'. At one end of each main air-chamber is an auxiliary air-chamber, A², provided with a pallet and operated by a stop to control the admission of air to the main air-chamber, and communicating with the wind-trunk B, leading from the bellows. (Not shown.) Above the main air-chambers are the pallet-chests A³, closed by the top board, C, which is perforated to receive the lower ends of the organ-pipes D, but otherwise air-tight, leaving shallow upper air-chambers, C', each extending transversely of the chest across all the pallets operated by a single key. There must be a separate main air-chamber, A', and independent stop air-chamber A² for each series of pipes, (two series being shown in the drawings, but any number required being constructed, according to the size and style of organ desired,) and separate upper air-chambers, C', running transversely to the lower main air-chambers, A', for every transverse row of pipes in the wind-chest—that is, one upper air-chamber, C', for all the C-pipes, one for all the C♯-pipes, &c.—fed by means of the air-tubes c, one to every key, as hereinafter explained.

E E represent the key-pallets, in size corresponding to the size of the pipes controlled thereby, made circular in horizontal section, and provided with downward-depending stems $e$, extending through perforations in the guide-strips F within the main air-chambers. These pallets are made fully one-third larger than the holes $a$ in the bottom of the pallet-chest underneath them, which they are to close, and are slightly attached at top to pieces of leather or other flexible material, a', which pieces in turn are secured at their outer edges to the pallet-chest, so as to be perfectly air-tight, and yet so light and flexible as to rise and fall with the pallets without any resistance.

G G represent the air-passages in the pallet-chests leading to the organ-pipes D, and H H represent the air-passages leading from the auxiliary or stop air-chambers A² to the main air-chambers A'. The wind-trunk B, leading from the bellows, connects with all the auxiliary chambers A², and these chambers are each provided with a single pallet, E', called the "stop-pallet," having stem and guide-strip, like the key-pallets E, and operating in similar manner.

I represents the small valve-chest, situated in the rear of the key-board, and placed anywhere most convenient between it and the wind-chest. In large organs, or those having several banks of keys, the small valve-chest is connected with the wind-chest by the tubes $c$, as shown in Figs. 2 and 3; but in small organs the small valve-chest may be placed directly against the end of the wind-chest, and simple air-passages may be formed directly in these chests, dispensing with tubes, all that is required being air-passages of some sort connecting the two, irrespective of form or exact nature, it being understood that there must be a separate air-passage or air-tube with independent valves, springs, &c., as hereinafter described, for every key. The small valve-chest I receives air from the bellows from a wind-pipe, B', located wherever most convenient in its under surface, and the central space is devoted to the tubes, valves, &c., belonging to the keys, the air therefrom passing into the upper air-chambers, C', of the wind-chest through the tubes or passages $c$, as already described, while each end of the chest I is devoted to the tubes, valves, &c., belonging to the stops, the air passing through tubes $c'$ into the upper part, $c''$, of the auxiliary or stop air-chambers A² above the stop-pallets E'.

The entrance to the tubes or passages $c$ in the chest I is designated by $b$, and admission of air thereto is controlled from below by the valves $d$ and from above by the valves $f$. The lower valves are normally kept closed by very light springs $g$ and the upper valves by much heavier springs $h$, and the free ends of these valves have stickers $i$ between them, so that one valve must always be open when its fellow is closed, all as shown in Figs. 3 and 5. The entrance $b'$ for the air tubes or passages $c'$, governed by the stops, is similarly constructed and guarded, as shown in Figs. 7 and 8, the valves being marked $d'$ and $f'$ and the springs $g'$ and $h'$, respectively, and the stickers $i'$.

K represents the organ-keys, and $k$ strips secured to the upper valves, $f$, the keys and strips being connected together by stickers L, while M shows in section the front of the organ directly back of the key-board.

N, Fig. 7, shows a single stop, and N', Fig. 8, a modified form or double stop. The former is operated by pulling out the knob $n$, while the latter is operated by pushing in its lower knob, $n'$, (when it is desired to open the stops,) which raises the upper valve, $f'$, belonging to that stop by means of the rod $l$, connected to the end of the stem of the knob and pivoted at $m$, the upper portion of the rod $l$ bearing against the inclined face of the block $k''$ on the under side of the end of the strip $k'$, as shown in full and dotted lines in Figs. 7 and 8, thus closing the lower valve, $d'$, shutting off the communication between the air-tube $c'$ and the compressed air from the wind-pipe B' and opening the air-tube $c'$ to the atmospheric air, thereby relieving the pressure on the stop-pallet E' in the auxiliary air-chamber A² in the wind-chest, and enabling this pallet to be raised by the pressure of air from the wind-trunk B, which air rushes into that particular main air-chamber A' controlled by the stop opened through the passage H, thus filling the main air-chamber with compressed air, and giving voice to the whole series of organ-pipes connected with that chamber upon pressing the keys connected therewith. The key-pallets E are operated in a similar manner. The depression of a key fulcrumed on the point O raises the sticker L, strip $k$, and upper valve, $f$, when the spring $g$ closes the lower valve, $d$, thus releasing the compressed air in the upper air-chamber, C', and causing the pallet E to be raised by the force of the compressed air in the main air-chamber A' beneath it, when this air will rush through the hole $a$ and air-passage G into the organ-pipe D and cause it to speak. On releasing the key the spring $h$, being much stronger than the spring $g$, will close the upper valve, $f$, in the small valve-chest, and the sticker $i$ will automatically depress the lower valve, $d$, the weaker spring $g$ yielding, and then the compressed air which fills the lower part of the small valve-chest from the bellows through wind-pipe B' will in turn rush through tube or passage $c$ into the upper air-chamber, C', of the wind-chest, and as the wind underneath in the main air-chamber is escaping all the time through the air-passages $a$ and G it will have less pressure than the wholly confined and compressed air in the air-chamber C' above, and therefore this latter air, assisted by the weight of the pallet itself, will instantly depress the pallet and close the hole $a$, and the pipe D will become mute. It will be seen that as soon as there is wind in the bellows all the key-pallets will remain tightly closed, even if some of the stops should be drawn by means of the pressure of wind on top of the key-pallets, the whole upper surface of the key-pallets being exposed, while below only that portion is exposed which is left uncovered by the holes $a$, and thus the pressure from below is overcome by the greater surface exposed to the action of the compressed air above, which is always on, except when a key is touched, when the pressure is at once taken off the respective pallet, and the pressure of wind underneath the pallet from the main air-chamber will at once raise the pallet and open a passage for the compressed air. The stop-pallets in the auxiliary air-chambers A² operate in an analogous manner.

Among the many advantages accruing from my invention are the following:

First. It does away with all mechanical connection between the keys and the pallets in the wind-chest, and no springs are needed to close any of these pallets. Hence there is no connecting mechanism to get out of order.

Secondly. Each organ-pipe has its own pallet, and receives its wind direct from the main air-chamber, and all the pallets open and close automatically, independently, and instantaneously, and hence there is no possibility of "running" or "ciphering."

Thirdly. The pressure of wind causes no resistance to the key, and consequently the touch of the key is extremely light and easy, and no heavier in the largest organ than it is in the smallest.

Fourthly. Inasmuch as springs and metallic connections are dispensed with, atmospheric changes have no damaging influence.

Fifthly. The stops being operated in the same way as and with no more resistance than the keys, opportunity is afforded for any desired number of combinations to be operated with either hand or foot, without the use of the pneumatic lever, and with perfect ease and precision.

Sixthly. On account of the extreme flexibility of the pallet-covers and the ease and precision with which they operate, the tone is not harsh at the commencement, but smooth and even from the start.

Seventhly. Owing to the manner in which the stops operate, their number in an organ may be indefinitely increased without calling for increased exertion in operating the keys, the same light touch answering for fifty stops as well as for one.

Eighthly. My improved chests may be constructed wholly by machinery, and thus very cheaply, enabling them to be sold to the trade as distinct articles of manufacture and at much less cost than the ordinary wind-chests now in use.

My device is especially adapted to pipe-organs; but it may be applied to reed-organs without departing from the spirit of my invention.

Having thus described my invention, what I claim as new, and desire to secure by Letters Patent, is—

1. In a pneumatic chest for organs, the combination of the main air-chambers A', pallet-chests A$^3$, having air-passages $a$ G, upper air-chambers, C', key-pallets E, arranged above the air-passage $a$, pallet-covers $a'$, top board, C, and frame having air-passages H and $c$, all arranged as shown and described, and for the purpose set forth.

2. In a pneumatic chest for organs, the combination of the auxiliary air-chamber A$^2$, having upper air-chamber, $c''$, stop-pallet E', air-pipe $c'$, wind-trunk B, and main air-chamber A', connected to the auxiliary air-chamber by the air-passage H, all arranged as shown and described, and for the purpose set forth.

3. The pneumatic chest for organs described, consisting of the main air-chambers A', auxiliary air-chambers A$^2$, upper air-chambers, C' $c''$, pallet-chests A$^3$, pallets E E', with flexible air-tight covers and guides, top board, C, and frame, with air-passages $a$, G, $c$, $c'$, H, and B, all combined and operating as shown and described, and for the purpose set forth.

In testimony that I claim the foregoing I have hereunto set my hand this 13th day of September, 1881.

PHILIP ODENBRETT.

Witnesses:
STANLEY S. STOUT,
HAROLD G. UNDERWOOD.